(12) United States Patent
Chen et al.

(10) Patent No.: US 10,883,526 B2
(45) Date of Patent: Jan. 5, 2021

(54) FULLY AUTOMATIC TELESCOPIC ROD

(71) Applicant: Xiamen Mingho Brothers MFG Co., Ltd., Fujian (CN)

(72) Inventors: Tien-Cheng Chen, Xiamen (CN); Sun-Feng Sung, Xiamen (CN)

(73) Assignee: XIAMEN MINGHO BROTHERS MFG CO., LTD., Fujian (CN)

( * ) Notice: Subject to any disclaimer, the term of this patent is extended or adjusted under 35 U.S.C. 154(b) by 566 days.

(21) Appl. No.: 15/579,594

(22) PCT Filed: Jun. 8, 2016

(86) PCT No.: PCT/CN2016/085236
§ 371 (c)(1),
(2) Date: Dec. 4, 2017

(87) PCT Pub. No.: WO2016/197941
PCT Pub. Date: Dec. 15, 2016

(65) Prior Publication Data
US 2018/0172046 A1      Jun. 21, 2018

(30) Foreign Application Priority Data

Jun. 11, 2015    (CN) .......................... 2015 1 0318229

(51) Int. Cl.
*F16B 7/14*          (2006.01)
(52) U.S. Cl.
CPC ......... *F16B 7/14* (2013.01); *Y10T 403/32516* (2015.01)

(58) Field of Classification Search
CPC .......... F16B 7/105; F16B 7/14; F16B 7/1418; F16B 7/149; Y10T 403/32516; Y10T 403/32524; Y10T 403/7077
USPC .................................. 403/109.7, 109.8, 377
See application file for complete search history.

(56) References Cited

U.S. PATENT DOCUMENTS

| 8,714,508 | B1 * | 5/2014 | Young | F16B 7/1409 403/109.1 |
| 8,757,183 | B2 * | 6/2014 | Volin | A45B 25/143 135/20.3 |
| 8,757,184 | B1 * | 6/2014 | Chen | A45B 19/10 135/24 |
| 8,800,576 | B2 * | 8/2014 | Chang | A45B 25/14 135/24 |
| 9,261,226 | B2 * | 2/2016 | Higashi | F16B 7/14 |
| 9,364,058 | B1 * | 6/2016 | Hsieh | A45B 9/00 |
| 9,526,307 | B1 * | 12/2016 | Hsieh | A45B 25/16 |
| 2002/0141812 | A1 * | 10/2002 | Edelen | F16B 7/14 403/109.1 |

* cited by examiner

*Primary Examiner* — Josh Skroupa
(74) *Attorney, Agent, or Firm* — Leong C. Lei

(57) ABSTRACT

A fully automatic telescopic rod includes at least two sleeves and one operation handle. The operation handle is fitted to a lower end of an outer sleeve of the at least two sleeves. A first inner sleeve of the at least two sleeves is movably fitted in the outer sleeve. The operation handle includes a power mechanism therein. The power mechanism is connected to a screw rod extending into the first inner sleeve and drives the screw rod to rotate in a forward or reverse direction. A nut is mated with the screw rod and fixed to a lower end of the first inner sleeve. The first inner sleeve can be unfolded and folded relative to the outer sleeve and can be positioned at any position.

18 Claims, 15 Drawing Sheets

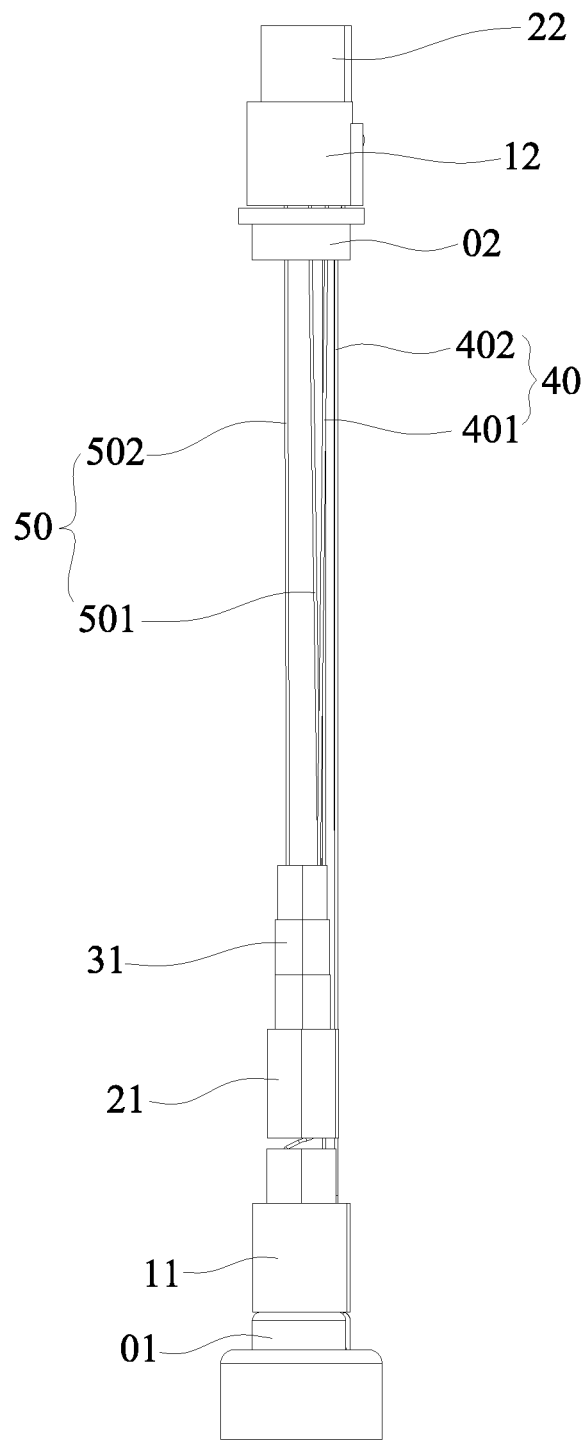
F I G. 5A

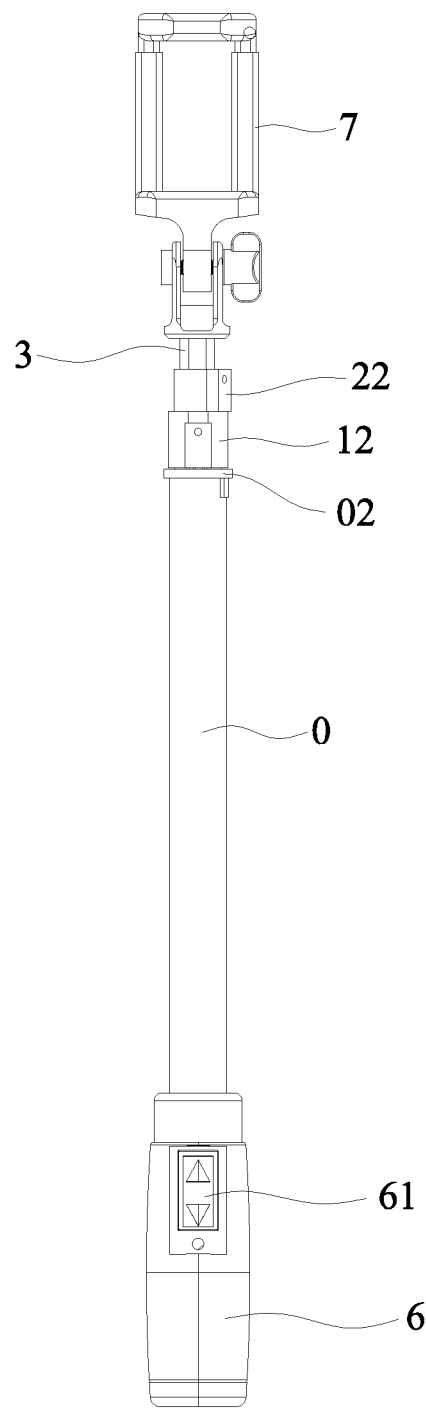
F I G. 9A

FULLY AUTOMATIC TELESCOPIC ROD

BACKGROUND OF THE INVENTION

1. Field of the Invention

The present invention relates to a telescopic rod, and more particularly to a fully automatic telescopic rod.

2. Description of the Prior Art

A telescopic rod is composed of a plurality of rods. The telescopic rod is widely used in our daily life, which can be folded to reduce its size to be carried and stored conveniently and can be unfolded to meet a desired length. A conventional telescopic rod structure uses a damper between the rods to position the rods after unfolded or folded. Another conventional telescopic rod structure uses a positioning member between the rods to position the rods after unfolded or folded. No matter what kind of telescopic rods, the telescopic rod is unfolded and folded manually. When in use, the length of the telescopic rod is adjusted repeatedly, and it cannot reach a desired length as soon as possible. It is inconvenient, time-consuming and laborious for use.

SUMMARY OF THE INVENTION

The primary object of the present invention is to provide a fully automatic telescopic rod which can be unfolded and folded automatically and can be positioned at any position stably.

In order to achieve the aforesaid object, the fully automatic telescopic rod of the present invention comprises at least two sleeves and one operation handle. The operation handle is fitted to a lower end of an outer sleeve of the at least two sleeves. A first inner sleeve of the at least two sleeves is movably fitted in the outer sleeve. The operation handle includes a power mechanism therein. The power mechanism is connected to a screw rod extending into the first inner sleeve. A nut is mated with the screw rod. The nut is fixed to a lower end of the first inner sleeve. The power mechanism drives the screw rod to rotate in a forward or reverse direction.

Preferably, an upper end of the first inner sleeve is provided with a retaining device.

Preferably, an upper end of the outer sleeve is provided with a limit mechanism, thereby preventing the first inner sleeve from disengaging from the upper end of the outer sleeve.

Preferably, the limit mechanism includes an outer sleeve fixing ring to confine the first inner sleeve, and the nut is fixed to the first inner sleeve through a first inner sleeve plug disposed at the lower end of the first inner sleeve.

Alternatively, the limit mechanism includes an engaging point provided at the upper end of the outer sleeve and a raised point provided at the lower end of the first inner sleeve, thereby preventing the first inner sleeve from disengaging from the upper end of the outer sleeve.

Preferably, the fully automatic telescopic rod is composed of three sleeves. A second inner sleeve and an adjusting pull rope are provided in the first inner sleeve. The adjusting pull rope includes an opening rope and a closing rope. First ends of the opening rope and the closing rope are fixed to a second inner sleeve plug provided at a lower end of the second inner sleeve. A second end of the opening rope is inserted between the second inner sleeve and the first inner sleeve to extend out of the first inner sleeve and pass through a first inner sleeve fixing ring pulley provided at an upper end of the first inner sleeve, and then is fixed to a lower end of the outer sleeve. A second end of the closing rope is inserted between the second inner sleeve and the first inner sleeve to extend out of the first inner sleeve and pass through a first inner plug pulley provided on the first inner sleeve plug at the lower end of the first inner sleeve, and then is fixed to the upper end of the outer sleeve or the outer sleeve fixing ring at the upper end of the outer sleeve.

Preferably, the second end of the opening rope is fixed to an outer sleeve plug provided at the lower end of the outer sleeve.

Preferably, an upper end of the first inner sleeve is provided with a first inner sleeve fixing ring. The first inner sleeve fixing ring is an annular ring fitted onto the upper end of the first inner sleeve. An inner wall of the first inner sleeve fixing ring is formed with an engaging edge to hold against the upper end of the first inner sleeve so as to confine the second inner sleeve. One side of an outer wall of the first inner sleeve fixing ring is provided with the first inner sleeve fixing ring pulley.

Preferably, a middle portion of the first inner sleeve plug at the lower end of the first inner sleeve is formed with a through hole for the screw rod to pass therethrough. The nut is fixed in the through hole. An upper end of an outer side of the through hole of the first inner sleeve plug is provided with the first inner plug pulley.

Preferably, a side wall of an upper portion of the first inner sleeve is formed with a first inner sleeve opening corresponding to a lower portion of the first inner sleeve fixing ring pulley of the first inner sleeve fixing ring. After the opening rope is inserted out of the first inner sleeve opening to pass through the first inner sleeve fixing ring pulley, the opening rope is inserted in the first inner sleeve opening and then fixed to the lower end of the outer sleeve.

Preferably, the first ends of the opening rope and the closing rope are fixed to the second inner sleeve plug provided at the lower end of the second inner sleeve. The opening rope has a length greater than that of the closing rope. The opening rope and the closing rope are formed by a pull rope.

Preferably, an upper end of the second inner sleeve is provided with a retaining device.

Preferably, the fully automatic telescopic rod is composed of four sleeves. A third inner sleeve and a second adjusting pull rope are provided in the second inner sleeve. The second adjusting pull rope includes a second opening rope and a second closing rope. First ends of the second opening rope and the second closing rope are fixed to a third inner sleeve plug provided at a lower end of the third inner sleeve. A second end of the second opening rope is inserted between the third inner sleeve and the second inner sleeve to extend out of the second inner sleeve and pass through a second inner sleeve fixing ring pulley at an upper end of the second inner sleeve, and then is fixed to the lower end of the first inner sleeve. A second end of the second closing rope is inserted between the third inner sleeve and the second inner sleeve to extend out of the second inner sleeve and pass through a second inner plug pulley provided on the second inner sleeve plug at the lower end of the second inner sleeve, and then is fixed to a first inner sleeve fixing ring at the upper end of the first inner sleeve.

Preferably, the second end of the second opening rope is fixed to the inner sleeve plug provided at the lower end of the first inner sleeve.

Preferably, the upper end of the second inner sleeve is provided with a second inner sleeve fixing ring. The second inner sleeve fixing ring is an annular ring fitted onto the upper end of the second inner sleeve. An inner wall of the first second sleeve fixing ring is formed with an engaging edge to hold against the upper end of the second inner sleeve so as to confine the third inner sleeve. One side of an outer wall of the second inner sleeve fixing ring is provided with the second inner sleeve fixing ring pulley.

Preferably, an upper end of an outer side of the second inner sleeve plug at the lower end of the second inner sleeve is provided with the second inner plug pulley.

Preferably, a side wall of an upper portion of the second inner sleeve is formed with a second inner sleeve opening corresponding to a lower portion of the second inner sleeve fixing ring pulley of a second inner sleeve fixing ring. After the second opening rope is inserted out of the second inner sleeve opening to pass through the second inner sleeve fixing ring pulley, the second opening rope is inserted in the second inner sleeve opening and then fixed to the first inner sleeve plug at the lower end of the first inner sleeve.

Preferably, the first ends of the second opening rope and the second closing rope of the second adjusting pull rope are fixed to the third inner sleeve plug provided at the lower end of the third inner sleeve. The second opening rope has a length greater than that of the second closing rope. The second opening rope and the second closing rope are formed by a pull rope.

Preferably, an upper end of the third inner sleeve is provided with a retaining device.

Preferably, the fully automatic telescopic rod is composed of N sleeves, N≥3. A N−1 inner sleeve and a N−2 adjusting pull rope are provided in a N−2 inner sleeve. The N−2 adjusting pull rope includes a N−2 opening rope and a N−2 closing rope. First ends of the N−2 opening rope and the N−2 closing rope are fixed to a lower end of the N−1 inner sleeve. A second end of the N−2 opening rope is inserted between the N−1 inner sleeve and the N−2 inner sleeve to extend out of the N−2 inner sleeve and pass through a N−2 inner sleeve fixing ring pulley at an upper end of the N−2 inner sleeve, and then is fixed to a lower end of a N−3 inner sleeve. A second end of the N−2 closing rope is inserted between the N−1 inner sleeve and the N−2 inner sleeve to extend out of the N−2 inner sleeve and pass through a N−2 inner plug pulley provided on a N−2 inner sleeve plug at a lower end of the N−2 inner sleeve, and then is fixed to an upper end of the N−3 inner sleeve or a N−3 inner sleeve fixing ring at the upper end of the N−3 inner sleeve.

Preferably, an upper end of the N−1 inner sleeve is provided with a retaining device.

In view of the above, the present invention is provided with the power mechanism. By operating the power mechanism to turn in a forward or reverse direction, the screw rod drives the nut mated therewith to move up and down along the screw rod, and thus the first inner sleeve connected the nut is unfolded or folded relative to the outer sleeve and realizes the positioning at any position. Therefore, the operator can easily and conveniently operate the fully automatic telescopic rod so as to reach a needed length of the rod.

Furthermore, the second inner sleeve, the third inner sleeve and the N inner sleeve are sequentially arranged in the first inner sleeve to cooperate with respective adjusting pull ropes. Each adjusting pull rope is composed of an opening rope and a closing rope. Each sleeve is provided with a pulley, such that the opening rope and the closing rope achieve the traction of the respective inner sleeves and the first inner sleeve to be simultaneously unfolded and folded, thereby providing a fully automatic function.

BRIEF DESCRIPTION OF THE DRAWINGS

FIG. 5A is a front view of the adjusting pull rope according to the third embodiment of the present invention (in a folded state);

FIG. 9A is a front view of the specific implementation according to the third embodiment of the present invention (in a folded state)

DETAILED DESCRIPTION OF THE PREFERRED EMBODIMENTS

Embodiments of the present invention will now be described, by way of example only, with reference to the accompanying drawings.

Figure 1:
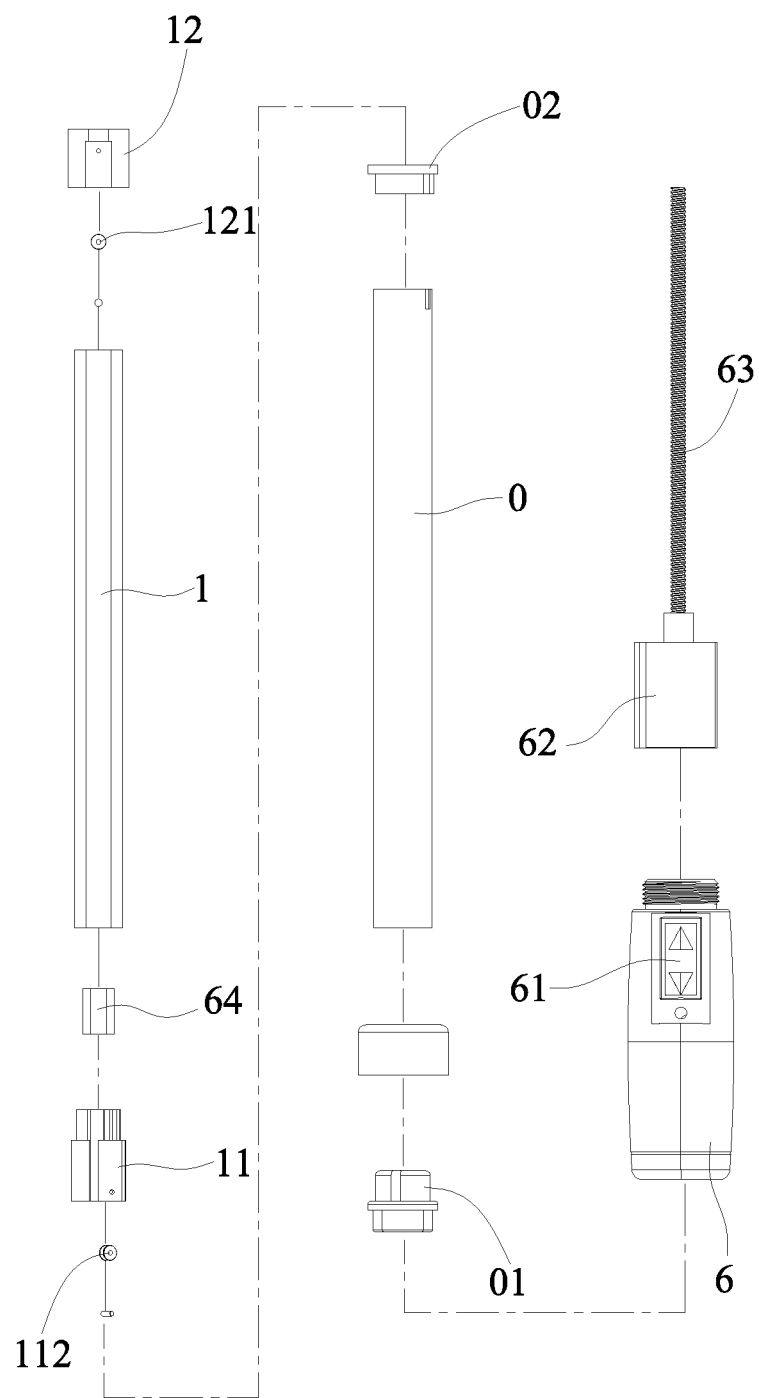
FIG. 1 is an exploded view according to a first embodiment of the present invention (two sleeves)

As shown in FIG. 1, the present invention discloses a fully automatic telescopic rod. The fully automatic telescopic rod comprises at least two sleeves and one operation handle 6. The operation handle 6 is fitted to a lower end of an outer sleeve 0 of the at least two sleeves. A first inner sleeve 1 of the at least two sleeves is movably fitted in the outer sleeve 0. The operation handle 6 includes a power mechanism 62 therein. The power mechanism 62 is connected to a screw rod 63 extending into the first inner sleeve 1. A nut 64 is mated with the screw rod 63. The nut 64 is fixed to a lower end of the first inner sleeve 1. The nut 64 may be fixed to the first inner sleeve 1 through a first inner sleeve plug 11. An upper end of the outer sleeve 0 is provided with an outer sleeve fixing ring 02 to confine the first inner sleeve 1, thereby preventing the first inner sleeve 1 from disengaging from the upper end of the outer sleeve

0. The upper end of the outer sleeve 0 may be provided with an engaging point, and the lower end of the first inner sleeve 1 may be provided with a raised point to form a limit mechanism, thereby preventing the first inner sleeve 1 from disengaging from the upper end of the outer sleeve 0. The power mechanism 62 is a motor to drive a gear set and is connected to the screw rod 63. The screw rod 63 may be rotated by mechanically driving in cooperation with a speed change gear set. The operation handle 6 is provided with a button 61 for operating the power mechanism 62. By operating the operation handle 6, the power mechanism 62 drives the screw rod 63 to rotate in a forward or reverse direction so as to move the nut 64 up and down along the screw rod 63, such that the first inner sleeve 1 can be unfolded and folded relative to the outer sleeve 0.

Figure 2:
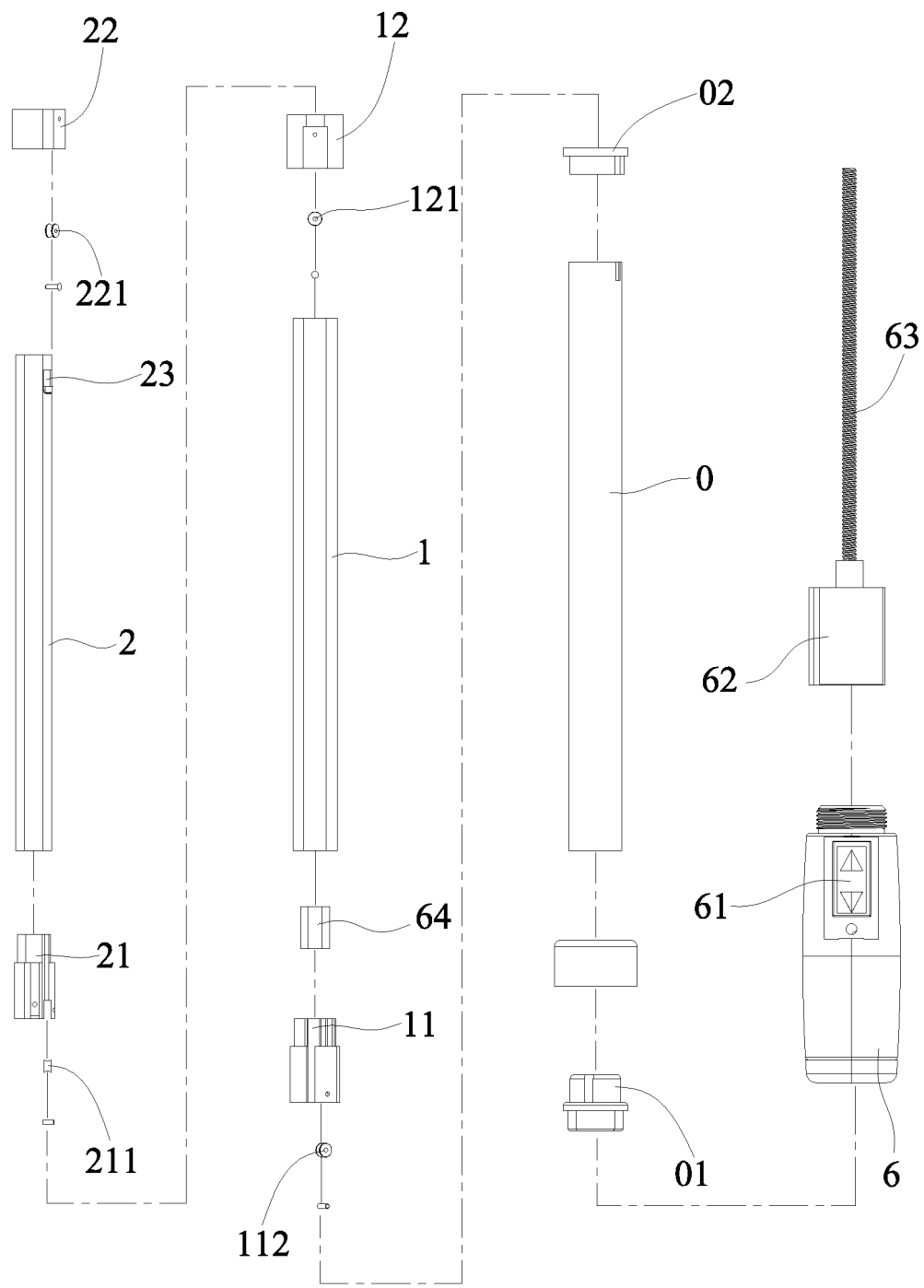
FIG. 2 is an exploded view according to a second embodiment of the present invention (three sleeves)

As shown in FIG. 2 and in conjunction with FIGS. 4A to 7B, the fully automatic telescopic rod of the present invention may be composed of three sleeves. A second inner sleeve 2 and an adjusting pull rope 40 are provided in the first inner sleeve 1. A middle portion of the first inner sleeve plug 11 at the lower end of the first inner sleeve 1 is formed with a through hole 111 for the screw rod 63 to pass therethrough. The nut 64 is fixed in the through hole 111. An upper end of an outer side of the through hole 111 of the first inner sleeve plug 11 is provided with a first inner plug pulley 112. An upper end of the first inner sleeve 1 is provided with a first inner sleeve fixing ring 12. The first inner sleeve fixing ring 12 is an annular ring fitted onto the upper end of the first inner sleeve 1. An inner wall of the first inner sleeve fixing ring 12 is formed with an engaging edge to hold against the upper end of the first inner sleeve 1 so as to confine the second inner sleeve 2. One side of an outer wall of the first inner sleeve fixing ring 12 is provided with a first inner sleeve fixing ring pulley 121. The adjusting pull rope 40 includes an opening rope 401 and a closing rope 402. First ends of the opening rope 401 and the closing rope 402 are fixed to a lower end of the second inner sleeve 2. Specifically, the first ends of the opening rope 401 and the closing rope 402 are fixed to a second inner sleeve plug 21 provided at the lower end of the second inner sleeve 2. Wherein, the length of the opening rope 401 is greater than the length of the closing rope 402. The opening rope 401 and the closing rope 402 may be formed by a pull rope. A second end of the opening rope 401 is inserted between the second inner sleeve 2 and the first inner sleeve 1 to extend out of the first inner sleeve 1 and pass through the first inner sleeve fixing ring pulley 121 at the upper end of the first inner sleeve 1, and then is fixed to the lower end of the outer sleeve 0 or an outer sleeve plug 01 provided at the lower end of the outer sleeve 0. A side wall of an upper portion of the first inner sleeve 1 is formed with a first inner sleeve opening 13 corresponding to a lower portion of the first inner sleeve fixing ring pulley 121 of the first inner sleeve fixing ring 12. That is, after the opening rope 401 is inserted out of the first inner sleeve opening 13 to pass through the first inner sleeve fixing ring pulley 121, the opening rope 401 is inserted in the first inner sleeve opening and then fixed to the outer sleeve plug 01 at the lower end of the outer sleeve 0. A second end of the closing rope 402 is inserted between the second inner sleeve 2 and the first inner sleeve 1 to extend out of the first inner sleeve 1 and pass through the first inner plug pulley 112 provided on the first inner sleeve plug 11 at the lower end of the first inner sleeve 1, and then is fixed to the upper end of the outer sleeve 0 or the outer sleeve fixing ring 02 at the upper end of the outer sleeve 0.

When the telescopic rod of the present invention is unfolded, the button 61 of the operation handle 6 is pressed to start the power mechanism 62 to output a forward rotation power to drive the screw rod 63 to rotate, and the nut 64 is moved upward along the screw rod 63, that is, the first inner sleeve 1 is driven to move upward relative to the outer sleeve 0. When the first inner sleeve 1 is moved upward, the distance between the first inner sleeve plug 11 and the outer sleeve plug 01 of the outer sleeve 0 is lengthened. The opening rope 401 pulls the second inner sleeve plug 21 to move upward relative to the first inner sleeve 1 to replenish the change of the distance, that is, the second inner sleeve 2 is simultaneously pushed to unfold relative to the first inner sleeve 1, thereby realizing the function of synchronously unfolding the three sleeves. By the function that the nut 64 can be positioned at any position of the screw rod 63 and the pulling action of the closing rope 402, the three sleeves can be unfolded at any position and won't be retracted.

When the telescopic rod of the present invention is retracted to shorten its length, the button 61 of the operation handle 6 is pressed to start the power mechanism 62 to output a reverse rotation power to drive the screw rod 63 to rotate, and the nut 64 is moved downward along the screw rod 63, that is, the first inner sleeve 1 is driven to move downward relative to the outer sleeve 0. When the first inner sleeve 1 is moved downward, the distance between the first inner sleeve plug 11 and the upper end of the outer sleeve 0 is lengthened. The closing rope 402 pulls the second inner sleeve plug 21 to move downward relative to the first inner sleeve 1 to replenish the change of the distance, that is, the second inner sleeve 2 is simultaneously retracted relative to the first inner sleeve 1, thereby realizing the function of synchronously retracting the three sleeves.

Figure 3:
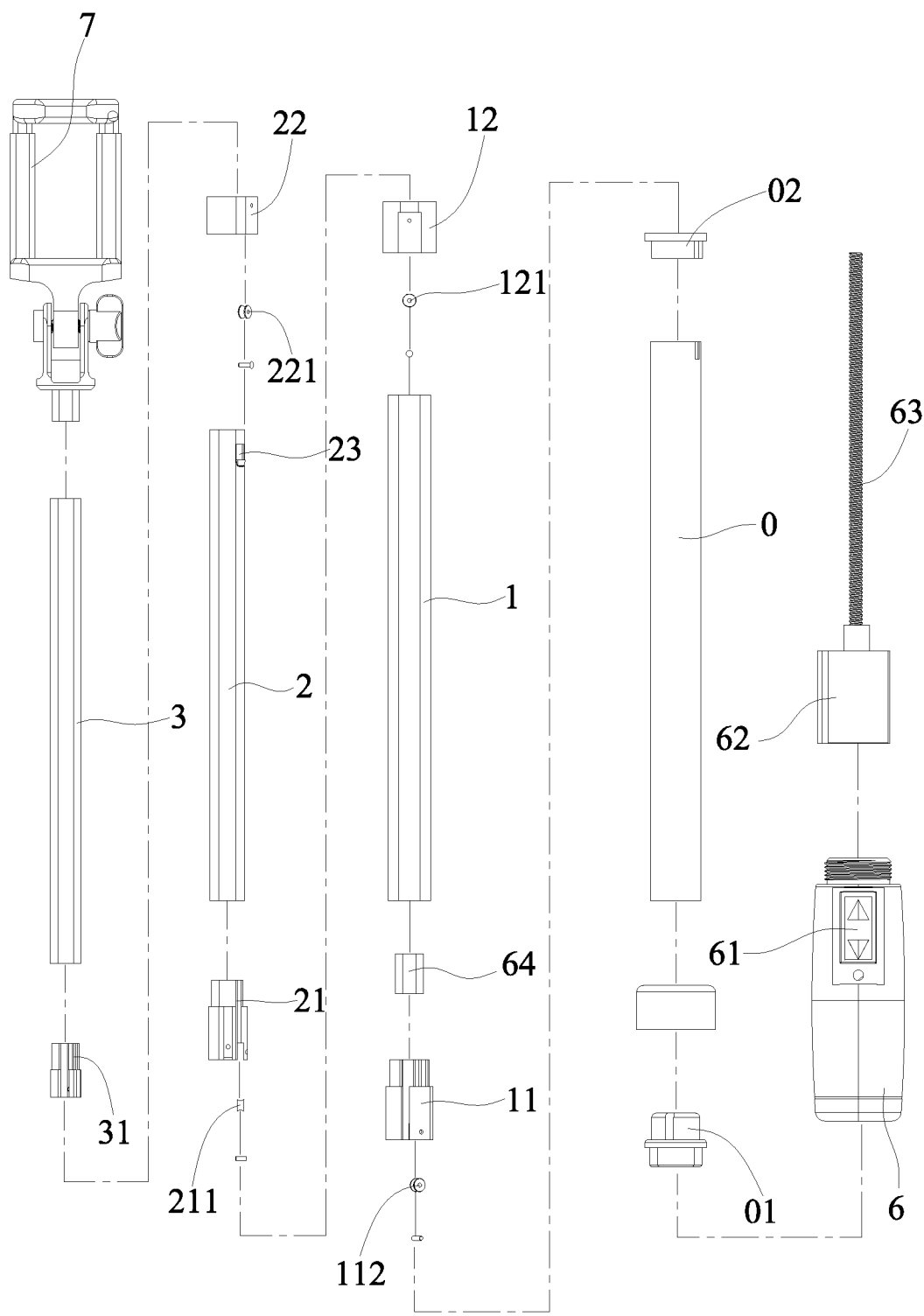
FIG. 3 is an exploded view according to a third embodiment of the present invention (four sleeves)
Figure 4A:
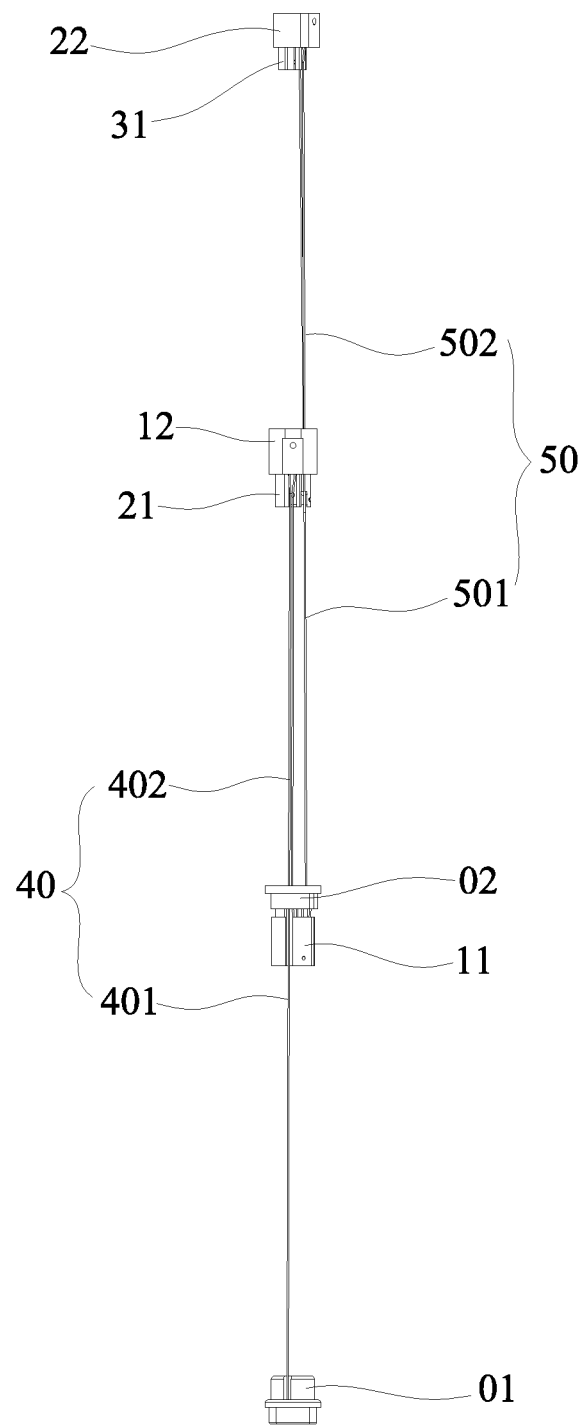
FIG. 4A is a front view of the adjusting pull rope according to the third embodiment of the present invention (in an unfolded state)
Figure 4B:
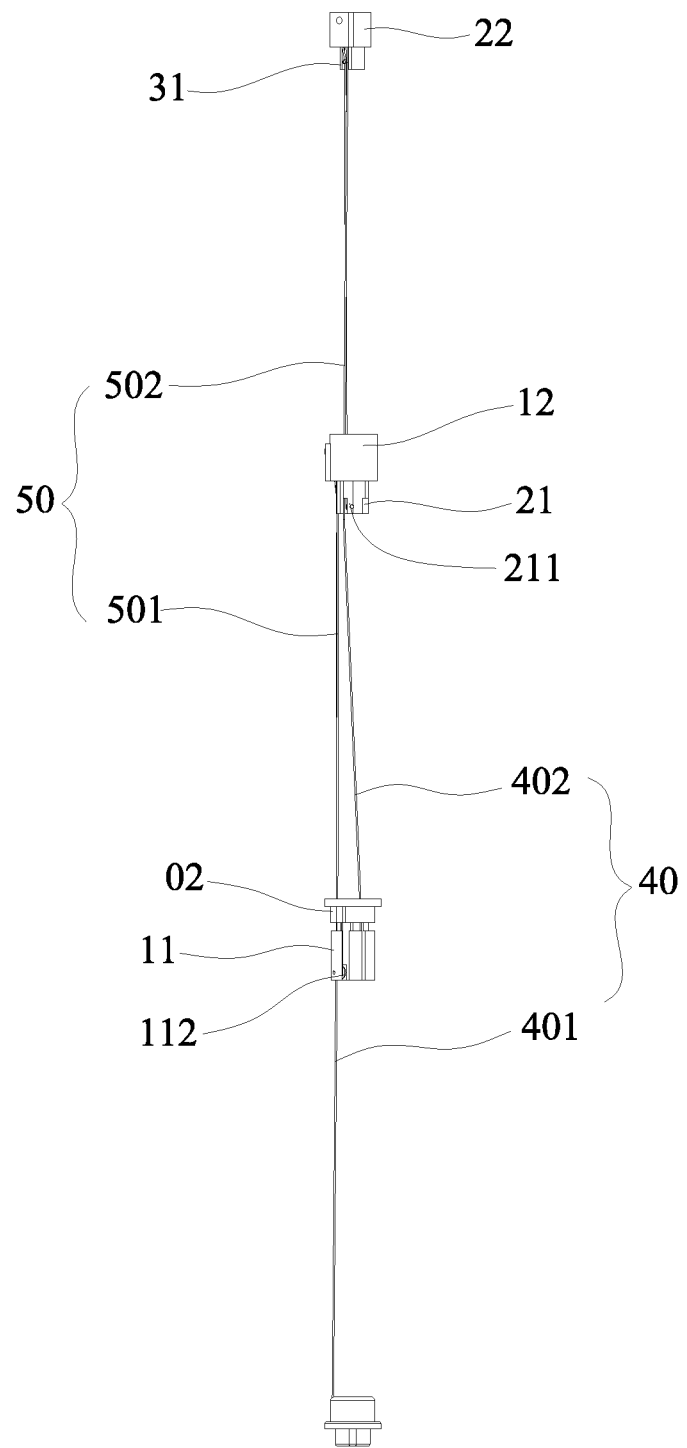
FIG. 4B is a side view of the adjusting pull rope according to the third embodiment of the present invention (in an unfolded state)
Figure 5B:
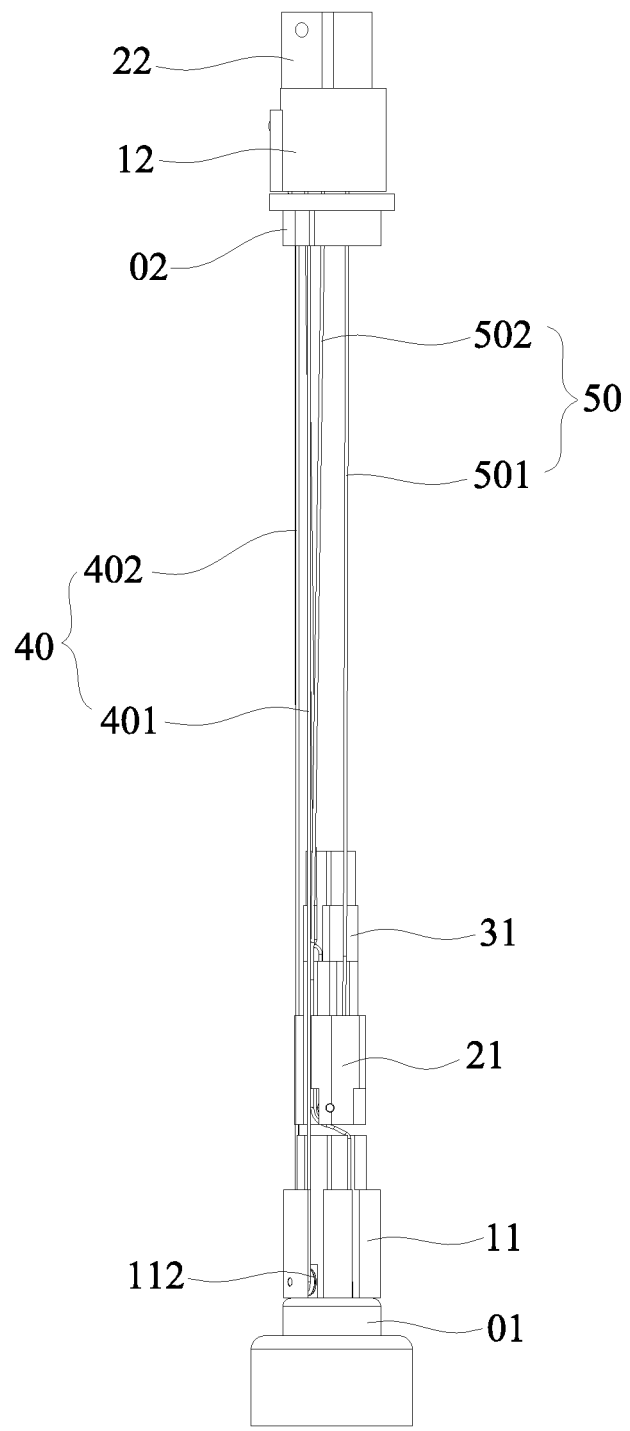
FIG. 5B is a side view of the adjusting pull rope according to the third embodiment of the present invention (in a folded state)
Figure 6A:
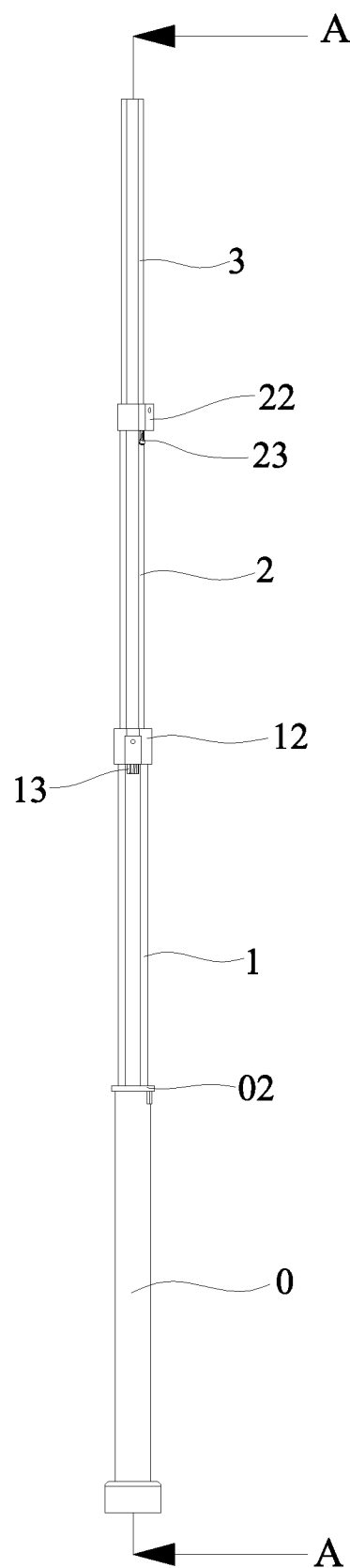
FIG. 6A is a front view of the four sleeves according to the third embodiment of the present invention (in an unfolded state)
Figure 6B:
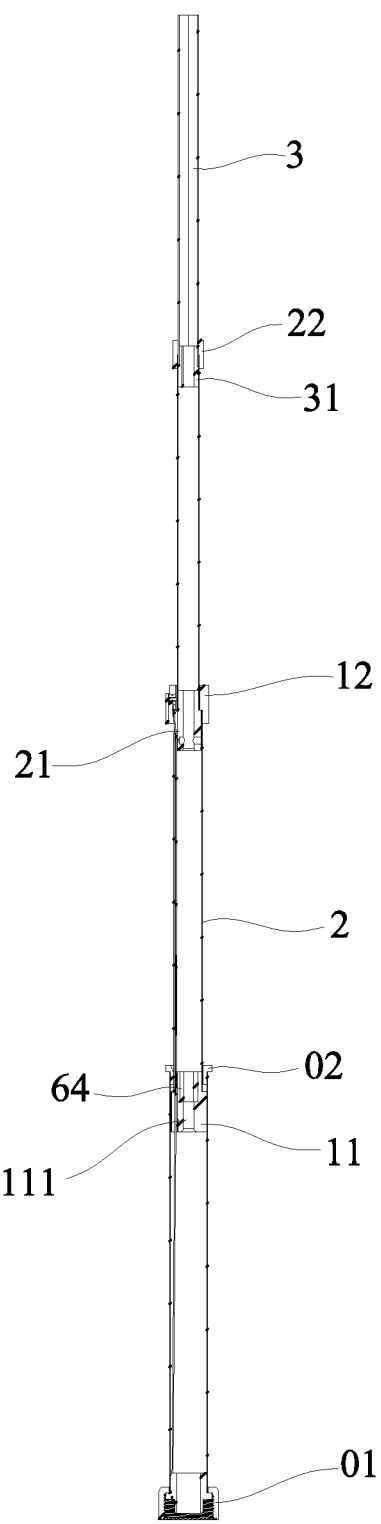
FIG. 6B is a sectional view of FIG. 6A (in an unfolded state)
Figure 7A:
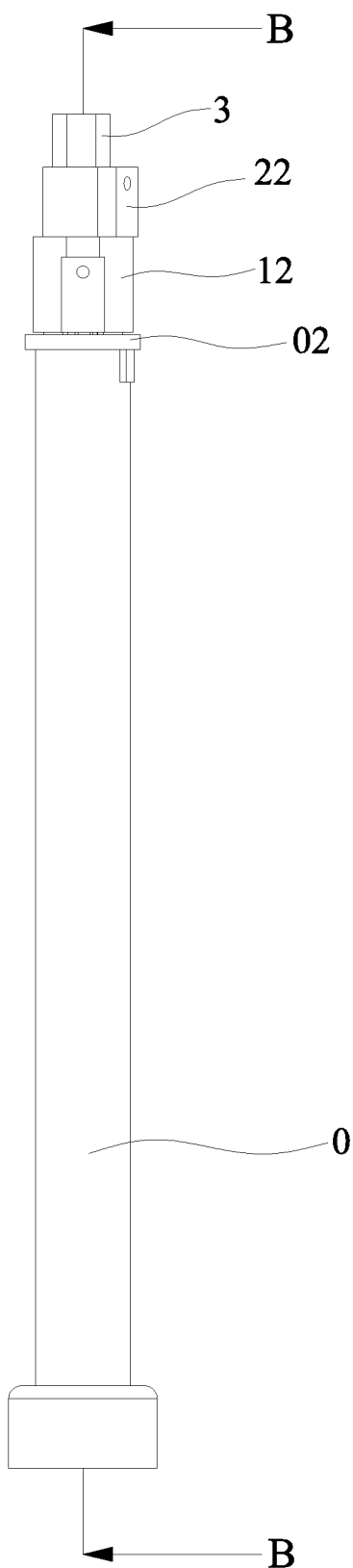
FIG. 7A is a front view of the four sleeves according to the third embodiment of the present invention (in a folded state)
Figure 7B:
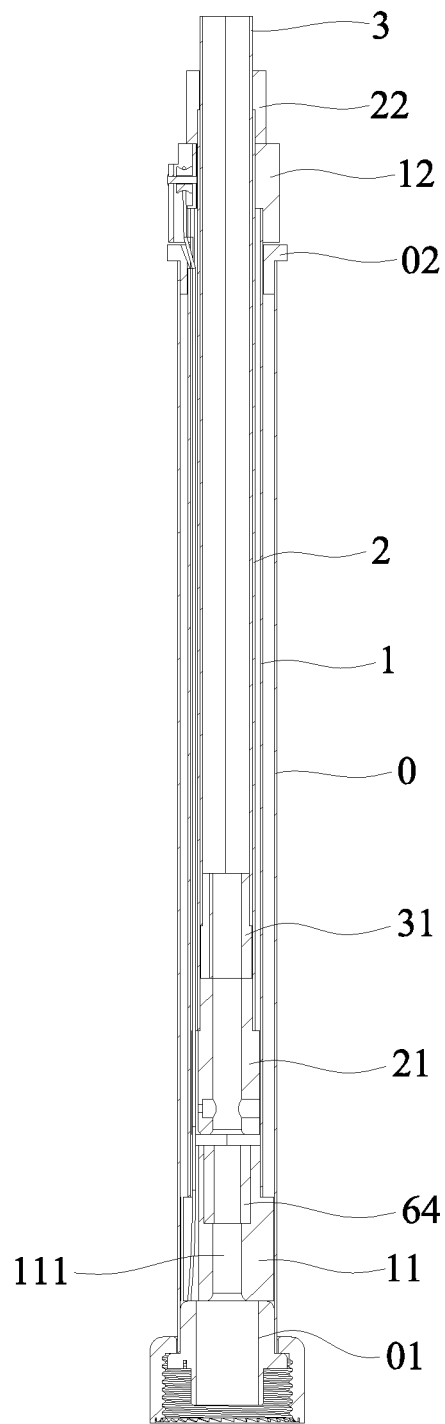
FIG. 7B is a sectional view of FIG. 7A (in a folded state)
Figure 8A:
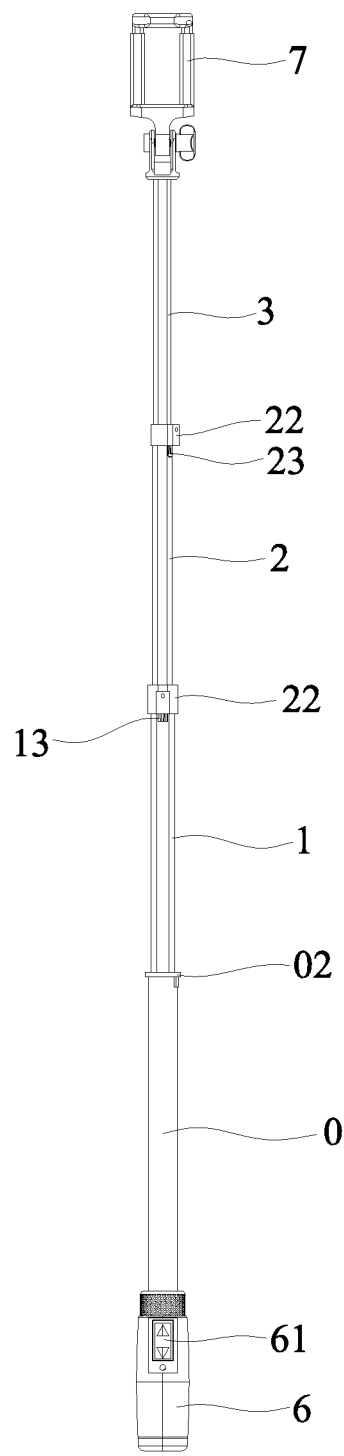
FIG. 8A is a front view of a specific implementation according to the third embodiment of the present invention (in an unfolded state)
Figure 8B:
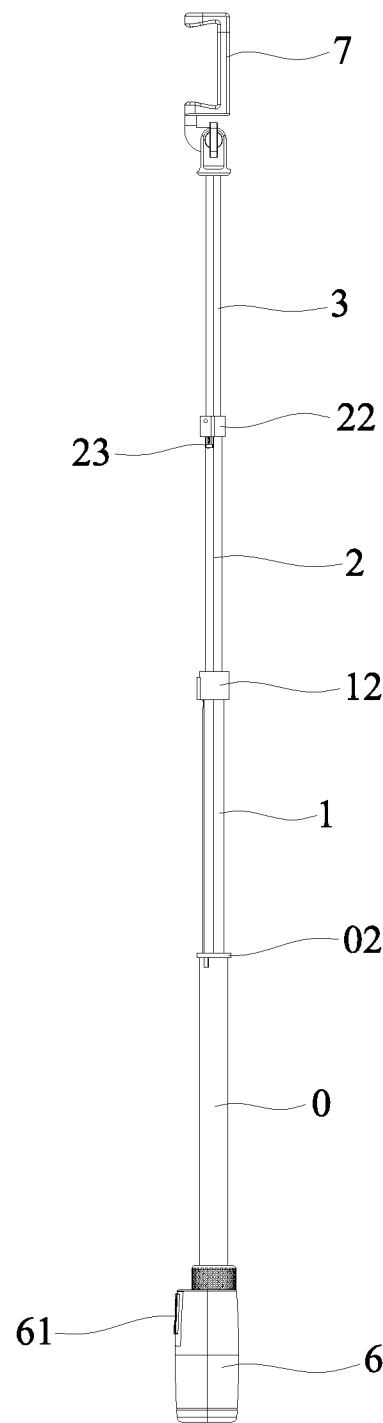
FIG. 8B is a side view of the specific implementation according to the third embodiment of the present invention (in an unfolded state)
Figure 9B:
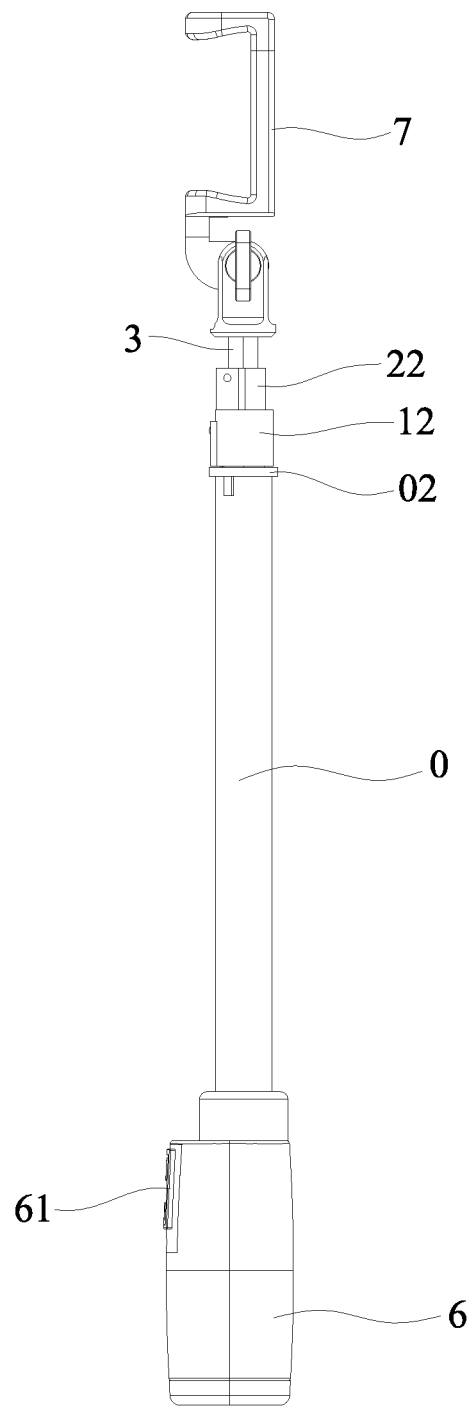
FIG. 9B is a side view of the specific implementation according to the third embodiment of the present invention (in a folded state).

As shown in FIG. 3 and FIG. 9B, the fully automatic telescopic rod of the present invention may be composed of four sleeves. A third inner sleeve 3 and a second adjusting pull rope 50 are provided in the second inner sleeve 2. Similarly, an upper end of one side of the second inner sleeve plug 21 at the lower end of the second inner sleeve 2 is provided with a second inner plug pulley 211. An upper end of the second inner sleeve 2 is provided with a second inner sleeve fixing ring 22. The second inner sleeve fixing ring 22 is an annular ring fitted onto the upper end of the second inner sleeve 2. An inner wall of the first second sleeve fixing ring 22 is formed with an engaging edge to hold against the upper end of the second inner sleeve 2 so as to confine the third inner sleeve 3. One side of an outer wall of the second inner sleeve fixing ring 22 is provided with a second inner sleeve fixing ring pulley 221. The second adjusting pull rope 50 includes a second opening rope 501 and a second closing rope 502. First ends of the second opening rope 501 and the second closing rope 502 are fixed to a lower end of the third inner sleeve 3. Specifically, the first ends of the second opening rope 501 and the second closing rope 502 are fixed to a third inner sleeve plug 31 provided at the lower end of the third inner sleeve 3. Wherein, the length of the second opening rope 501 is greater than the length of the second closing rope 502. The second opening rope 501 and the second closing rope 502 may be formed by a pull rope. A second end of the second opening rope 501 is inserted between the third inner sleeve 3 and the second inner sleeve 2 to extend out of the second inner sleeve 2 and pass through the second inner sleeve fixing ring pulley 221 at the upper end of the second inner sleeve 2, and then is fixed to the lower end of the first inner sleeve 1 or the first inner sleeve plug 11 provided at the lower end of the first inner sleeve 1. A side wall of an upper portion of the second inner sleeve 2 is formed with a second inner sleeve opening 23 corresponding to a lower portion of the second inner sleeve fixing ring pulley 221 of the second inner sleeve fixing ring 22. That is, the second opening rope 501 is inserted out of the second inner sleeve opening 23 to pass through the second inner sleeve fixing ring pulley 221, and is inserted in the second inner sleeve opening 23, and then is fixed to the first inner sleeve plug 11 at the lower end of the first inner sleeve 1. A second end of the second closing rope 502 is inserted between the third inner sleeve 3 and the second inner sleeve 2 to extend out of the second inner sleeve 2 and pass through the second inner plug pulley 211 provided on the second inner sleeve plug 211 at the lower end of the second inner sleeve 2, and then is fixed to the upper end of the first inner sleeve 1 or the first inner sleeve fixing ring 12 at the upper end of the first inner sleeve 1.

By analogy, the fully automatic telescopic rod of the present invention may be composed of five or more sleeves, and it is only required to increase the inner sleeve and the adjusting rope and to cooperate with the plug and the pulley on the fixing ring of the previous inner sleeve. That is, when the fully automatic telescopic rod is composed of N sleeves (N≥3), a N−1 inner sleeve and a N−2 adjusting pull rope are provided in a N−2 inner sleeve. The N−2 adjusting pull rope includes a N−2 opening rope and a N−2 closing rope. First ends of the N−2 opening rope and the N−2 closing rope are fixed to a N−1 inner sleeve plug provided a lower end of the N−1 inner sleeve. A second end of the N−2 opening rope is inserted between the N−1 inner sleeve and the N−2 inner sleeve to extend out of the N−2 inner sleeve and pass through a N−2 inner sleeve fixing ring pulley at an upper end of the N−2 inner sleeve, and then is fixed to a N−3 inner sleeve plug provided at a lower end of a N−3 inner sleeve. A second end of the N−2 closing rope is inserted between the N−1 inner sleeve and the N−2 inner sleeve to extend out of the N−2 inner sleeve and pass through a N−2 inner plug pulley provided on a N−2 inner sleeve plug at a lower end of the N−2 inner sleeve, and then is fixed to an upper end of the N−3 inner sleeve or a N−3 inner sleeve fixing ring at the upper end of the N−3 inner sleeve.

When the four-section telescopic rod of the present invention is unfolded, the button 61 of the operation handle 6 is pressed to start the power mechanism 62 to output a forward rotation power to drive the screw rod 63 to rotate, and the nut 64 is moved upward along the screw rod 63, that is, the first inner sleeve 1 is driven to move upward relative to the outer sleeve 0. When the first inner sleeve 1 is moved upward, the distance between the first inner sleeve plug 11 and the outer sleeve plug 01 is lengthened. The opening rope 401 pulls the second inner sleeve plug 21 to move upward relative to the first inner sleeve 1 to replenish the change of the distance, that is, the second inner sleeve 2 is simultaneously pushed to unfold relative to the first inner sleeve 1. At the same time, when the second inner sleeve 2 is moved upward, the distance between the second inner sleeve plug 21 and the first inner sleeve plug 11 is lengthened. The second opening rope 501 pulls the third inner sleeve plug 31 to move upward relative to the second inner sleeve 2 to replenish the change of the distance, that is, the third inner sleeve 3 is simultaneously pushed to unfold relative to the second inner sleeve 2. In this way, the four sleeves can be unfolded synchronously.

When the telescopic rod of the present invention is retracted to shorten its length, the button 61 of the operation handle 6 is pressed to start the power mechanism 62 to output a reverse rotation power to drive the screw rod 63 to rotate, and the nut 64 is moved downward along the screw rod 63, that is, the first inner sleeve 1 is driven to move downward relative to the outer sleeve 0. When the first inner sleeve 1 is moved downward, the distance between the first inner sleeve plug 11 and the upper end of the outer sleeve 0 is lengthened. The closing rope 402 pulls the second inner sleeve plug 21 to move downward relative to the first inner sleeve 1 to replenish the change of the distance, that is, the second inner sleeve 2 is simultaneously retracted relative to the first inner sleeve 1. At the same time, when the second inner sleeve 2 is moved downward, the distance between the second inner sleeve plug 21 and the upper end of the first inner sleeve 1 is lengthened. The second closing rope 502 pulls the third inner sleeve plug 31 to move downward relative to the second inner sleeve 2 to replenish the change of the distance, that is, the third inner sleeve 3 is simultaneously retracted relative to the second inner sleeve 2. In this way, the four sleeves can be retracted synchronously.

In view of the above, the present invention is provided with the power mechanism 62. By operating the power mechanism 62 to turn in a forward or reverse direction, the screw rod 63 drives the nut 64 mated therewith to move up and down along the screw rod 63, and thus the first inner sleeve 1 connected the nut 64 is unfolded or folded relative to the outer sleeve 0 and realizes the positioning at any position. Therefore, the operator can easily and conveniently operate the fully automatic telescopic rod so as to reach a needed length of the rod.

Furthermore, depending on the retraction and the working length of the desired telescopic rod, the second inner sleeve 2, the third inner sleeve 3 and the N inner sleeve are sequentially arranged in the first inner sleeve 1 to cooperate with respective adjusting pull ropes. Each adjusting pull rope is composed of an opening rope and a closing rope. Each sleeve is provided with a pulley, such that the opening rope and the closing rope achieve the traction of the respective inner sleeves and the first inner sleeve to be simultaneously unfolded and folded, thereby providing a fully automatic function.

The fully automatic telescopic rod of the present invention may be applied to various places. As shown in FIG. 8A to FIG. 9B, a retaining device 7 is fitted to the upper end of the innermost sleeve for retaining a mobile phone to form a selfie stick. The upper end of the innermost sleeve may be provided with an appropriate retaining device to achieve the desired application for various telescopic rods.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A fully automatic telescopic rod, comprising:
   at least two sleeves and one operation handle, the operation handle being fitted to a lower end of an outer sleeve of the at least two sleeves;
   a first inner sleeve of the at least two sleeves being movably fitted in the outer sleeve;
   the operation handle including a power mechanism therein, the power mechanism being connected to a screw rod extending into the first inner sleeve;
   a nut being mated with the screw rod, the nut being fixed to a lower end of the first inner sleeve;
   the power mechanism driving the screw rod to rotate in a forward or reverse direction;
   wherein an upper end of the outer sleeve is provided with a limit mechanism, thereby preventing the first inner sleeve from disengaging from the upper end of the outer sleeve;

wherein the limit mechanism includes an outer sleeve fixing ring to confine the first inner sleeve, and the nut is fixed to the first inner sleeve through a first inner sleeve plug disposed at the lower end of the first inner sleeve;

wherein the fully automatic telescopic rod is composed of three sleeves, a second inner sleeve and an adjusting pull rope are provided in the first inner sleeve, the adjusting pull rope includes an opening rope and a closing rope, first ends of the opening rope and the closing rope are fixed to a second inner sleeve plug provided at a lower end of the second inner sleeve; a second end of the opening rope is inserted between the second inner sleeve and the first inner sleeve to extend out of the first inner sleeve and pass through a first inner sleeve fixing ring pulley provided at an upper end of the first inner sleeve and then is fixed to a lower end of the outer sleeve; a second end of the closing rope is inserted between the second inner sleeve and the first inner sleeve to extend out of the first inner sleeve and pass through a first inner plug pulley provided on the first inner sleeve plug at the lower end of the first inner sleeve and then is fixed to the upper end of the outer sleeve or the outer sleeve fixing ring at the upper end of the outer sleeve.

2. The fully automatic telescopic rod as claimed in claim 1, wherein an upper end of the first inner sleeve is provided with a retaining device.

3. The fully automatic telescopic rod as claimed in claim 1, wherein the limit mechanism includes an engaging point provided at the upper end of the outer sleeve and a raised point provided at the lower end of the first inner sleeve, thereby preventing the first inner sleeve from disengaging from the upper end of the outer sleeve.

4. The fully automatic telescopic rod as claimed in claim 1, wherein the second end of the opening rope is fixed to an outer sleeve plug provided at the lower end of the outer sleeve.

5. The fully automatic telescopic rod as claimed in claim 1, wherein an upper end of the first inner sleeve is provided with a first inner sleeve fixing ring, the first inner sleeve fixing ring is an annular ring fitted onto the upper end of the first inner sleeve, an inner wall of the first inner sleeve fixing ring is formed with an engaging edge to hold against the upper end of the first inner sleeve so as to confine the second inner sleeve, and one side of an outer wall of the first inner sleeve fixing ring is provided with the first inner sleeve fixing ring pulley.

6. The fully automatic telescopic rod as claimed in claim 5, wherein a side wall of an upper portion of the first inner sleeve is formed with a first inner sleeve opening corresponding to a lower portion of the first inner sleeve fixing ring pulley of the first inner sleeve fixing ring, after the opening rope is inserted out of the first inner sleeve opening to pass through the first inner sleeve fixing ring pulley, the opening rope is inserted in the first inner sleeve opening and then fixed to the lower end of the outer sleeve.

7. The fully automatic telescopic rod as claimed in claim 1, wherein a middle portion of the first inner sleeve plug at the lower end of the first inner sleeve is formed with a through hole for the screw rod to pass therethrough, the nut is fixed in the through hole, and an upper end of an outer side of the through hole of the first inner sleeve plug is provided with the first inner plug pulley.

8. The fully automatic telescopic rod as claimed in claim 1, wherein the first ends of the opening rope and the closing rope are fixed to the second inner sleeve plug provided at the lower end of the second inner sleeve, the opening rope has a length greater than that of the closing rope, and the opening rope and the closing rope are formed by a pull rope.

9. The fully automatic telescopic rod as claimed in claim 1, wherein an upper end of the second inner sleeve is provided with a retaining device.

10. The fully automatic telescopic rod as claimed in claim 1, wherein the fully automatic telescopic rod is composed of four sleeves, a third inner sleeve and a second adjusting pull rope are provided in the second inner sleeve, the second adjusting pull rope includes a second opening rope and a second closing rope, first ends of the second opening rope and the second closing rope are fixed to a third inner sleeve plug provided at a lower end of the third inner sleeve; a second end of the second opening rope is inserted between the third inner sleeve and the second inner sleeve to extend out of the second inner sleeve and pass through a second inner sleeve fixing ring pulley at an upper end of the second inner sleeve and then is fixed to the lower end of the first inner sleeve; a second end of the second closing rope is inserted between the third inner sleeve and the second inner sleeve to extend out of the second inner sleeve and pass through a second inner plug pulley provided on the second inner sleeve plug at the lower end of the second inner sleeve and then is fixed to a first inner sleeve fixing ring at the upper end of the first inner sleeve.

11. The fully automatic telescopic rod as claimed in claim 10, wherein the second end of the second opening rope is fixed to the inner sleeve plug provided at the lower end of the first inner sleeve.

12. The fully automatic telescopic rod as claimed in claim 10, wherein the upper end of the second inner sleeve is provided with a second inner sleeve fixing ring, the second inner sleeve fixing ring is an annular ring fitted onto the upper end of the second inner sleeve, an inner wall of the first second sleeve fixing ring is formed with an engaging edge to hold against the upper end of the second inner sleeve so as to confine the third inner sleeve, and one side of an outer wall of the second inner sleeve fixing ring is provided with the second inner sleeve fixing ring pulley.

13. The fully automatic telescopic rod as claimed in claim 10, wherein an upper end of an outer side of the second inner sleeve plug at the lower end of the second inner sleeve is provided with the second inner plug pulley.

14. The fully automatic telescopic rod as claimed in claim 13, wherein a side wall of an upper portion of the second inner sleeve is formed with a second inner sleeve opening corresponding to a lower portion of the second inner sleeve fixing ring pulley of a second inner sleeve fixing ring, after the second opening rope is inserted out of the second inner sleeve opening to pass through the second inner sleeve fixing ring pulley, the second opening rope is inserted in the second inner sleeve opening and then fixed to the first inner sleeve plug at the lower end of the first inner sleeve.

15. The fully automatic telescopic rod as claimed in claim 10, wherein the first ends of the second opening rope and the second closing rope of the second adjusting pull rope are fixed to the third inner sleeve plug provided at the lower end of the third inner sleeve, the second opening rope has a length greater than that of the second closing rope, and the second opening rope and the second closing rope are formed by a pull rope.

16. The fully automatic telescopic rod as claimed in claim 10, wherein an upper end of the third inner sleeve is provided with a retaining device.

17. The fully automatic telescopic rod as claimed in claim 1, wherein the fully automatic telescopic rod is composed of N sleeves, N≥3, a N−1 inner sleeve and a N−2 adjusting pull rope are provided in a N−2 inner sleeve, the N−2 adjusting pull rope includes a N−2 opening rope and a N−2 closing rope, first ends of the N−2 opening rope and the N−2 closing rope are fixed to a lower end of the N−1 inner sleeve; a second end of the N−2 opening rope is inserted between the N−1 inner sleeve and the N−2 inner sleeve to extend out of the N−2 inner sleeve and pass through a N−2 inner sleeve fixing ring pulley at an upper end of the N−2 inner sleeve and then is fixed to a lower end of a N−3 inner sleeve; a second end of the N−2 closing rope is inserted between the N−1 inner sleeve and the N−2 inner sleeve to extend out of the N−2 inner sleeve and pass through a N−2 inner plug pulley provided on a N−2 inner sleeve plug at a lower end of the N−2 inner sleeve and then is fixed to an upper end of the N−3 inner sleeve or a N−3 inner sleeve fixing ring at the upper end of the N−3 inner sleeve.

18. The fully automatic telescopic rod as claimed in claim 17, wherein an upper end of the N−1 inner sleeve is provided with a retaining device.

* * * * *